US012632599B2

(12) United States Patent
Anant

(10) Patent No.: US 12,632,599 B2
(45) Date of Patent: May 19, 2026

(54) DATA ANONYMISATION

(71) Applicant: Maya Data Privacy Limited, Dublin (IE)

(72) Inventor: Aaloka Anant, Dublin (IE)

(73) Assignee: Maya Data Privacy Limited, Dublin (IE)

( * ) Notice: Subject to any disclaimer, the term of this patent is extended or adjusted under 35 U.S.C. 154(b) by 21 days.

(21) Appl. No.: 18/903,223

(22) Filed: Oct. 1, 2024

(65) Prior Publication Data

US 2025/0111089 A1     Apr. 3, 2025

(30) Foreign Application Priority Data

Oct. 5, 2023     (EP) ..................................... 23201988

(51) Int. Cl.
G06F 21/62          (2013.01)
G06F 21/60          (2013.01)

(52) U.S. Cl.
CPC ........ G06F 21/6254 (2013.01); G06F 21/602 (2013.01)

(58) Field of Classification Search
None
See application file for complete search history.

(56) References Cited

U.S. PATENT DOCUMENTS

| | | | | |
|---|---|---|---|---|
| 2011/0276541 A1* | 11/2011 | Ono | .................... | G06F 21/6254 |
| | | | | 707/E17.007 |
| 2015/0082051 A1* | 3/2015 | Aggarwal | ............. | H04L 63/123 |
| | | | | 713/189 |
| 2016/0344702 A1* | 11/2016 | Ukena | ................ | G06Q 30/0201 |
| 2020/0311304 A1* | 10/2020 | Parthasarathy | ..... | G06F 11/3006 |
| 2021/0319557 A1* | 10/2021 | Gooding | ............. | G06N 3/0475 |
| 2023/0088867 A1* | 3/2023 | Jacobson | ............ | G06F 21/6254 |
| | | | | 726/26 |
| 2023/0376612 A1* | 11/2023 | Parekh | .................. | G06F 21/602 |
| 2024/0396752 A1* | 11/2024 | Khan | .................... | H04L 9/3239 |

* cited by examiner

*Primary Examiner* — Jeffrey R Swearingen
(74) *Attorney, Agent, or Firm* — Kevin J Fournier Intellectual Property Legal Services Ltd.; Kevin J Fournier

(57)          ABSTRACT

The present invention relates to computer-implemented data anonymisation comprising combining an original value with a seed value to form a combined value, processing the combined value to provide an output in the form of a string of characters, using characters from the hash string to determine a replacement value. The invention provides anonymised data sets which have retained utility relating to their intended purpose or function.

11 Claims, 6 Drawing Sheets

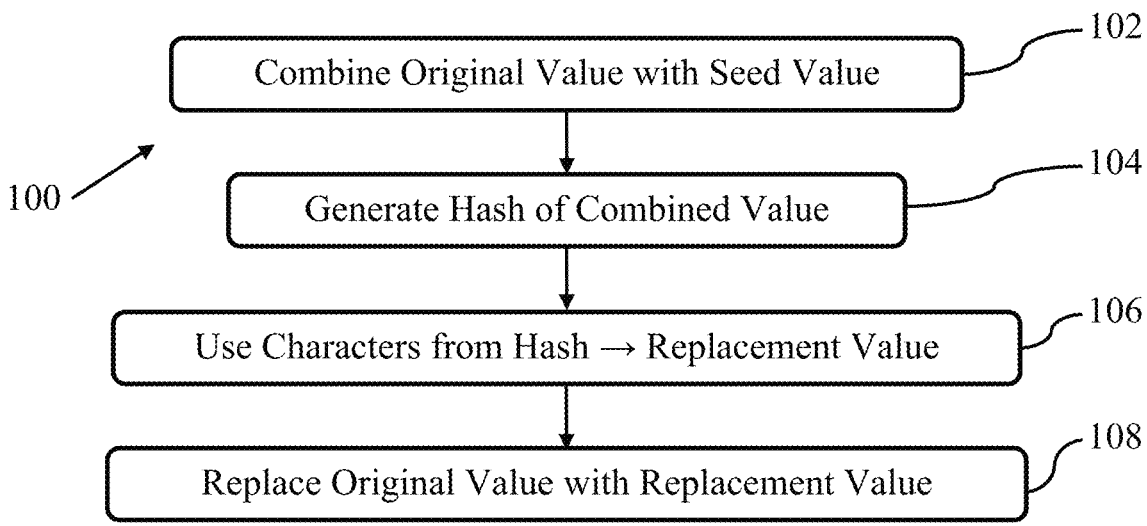

100

| Combine Original Value with Seed Value | — 102 |

| Generate Hash of Combined Value | — 104 |

| Use Characters from Hash → Replacement Value | — 106 |

| Replace Original Value with Replacement Value | — 108 |

Figure 1

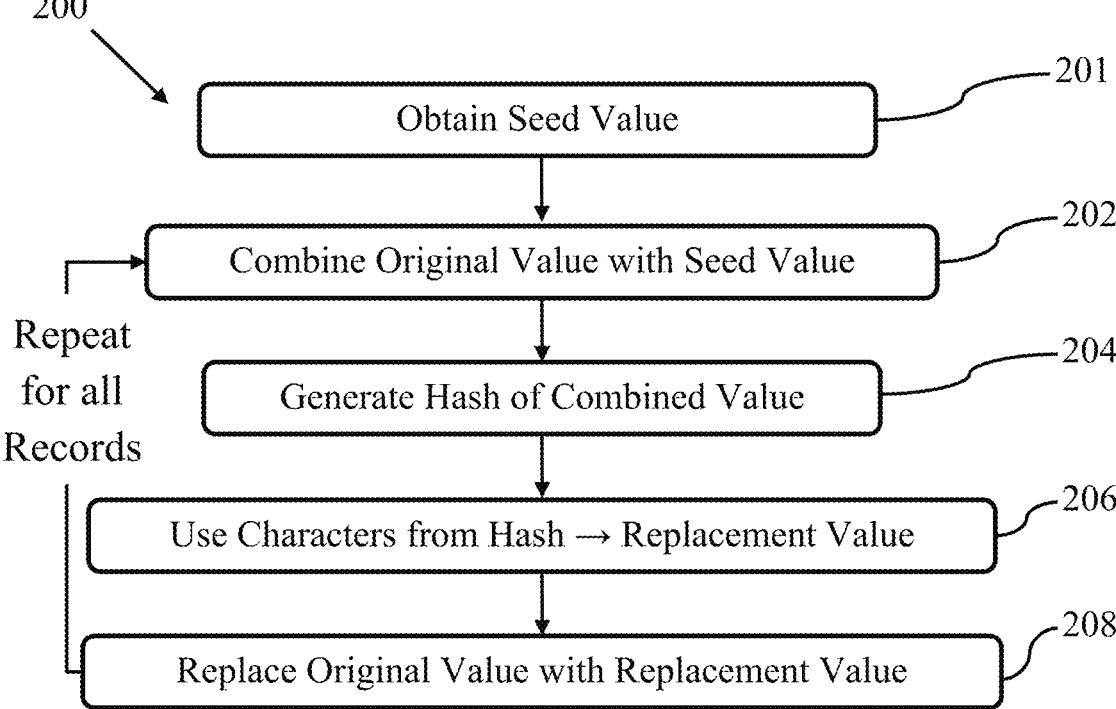

200

| Obtain Seed Value | — 201 |

| Combine Original Value with Seed Value | — 202 |

Repeat for all Records

| Generate Hash of Combined Value | — 204 |

| Use Characters from Hash → Replacement Value | — 206 |

| Replace Original Value with Replacement Value | — 208 |

Obtain Seed Value —201

Combine Original Value with Seed Value —202

Repeat for all Records

Generate Hash of Combined Value —204

Select Characters from Hash → Replacement Value —506

Replace Original Value with Replacement Value —208

| ID No. | Forename | Surname | Department | Detail X | Detail Y |
|---|---|---|---|---|---|
| 1 | Zara | Smith | Retail | Red | Yes |
| 2 | Adam | Jones | Marketing | Yellow | No |
| 3 | Sheila | Patel | Research | Yellow | No |
| 4 | Mumpta | Sharma | Marketing | Green | No |
| 5 | Mohan | Murphy | Engineering | Green | Yes |
| 6 | Juan | Estevez | Tech Support | Red | Yes |
| 7 | Pierre | Marsaud | Engineering | Green | No |
| 8 | Maria | Gallo | Research | Yellow | No |

| Hash Value | Replacement Value |
|---|---|
| *Email Local Part* | |
| 337bdcebeca71b06f2324bcf315b3aecdb2d16cc36e09b1ef1d14441db570442 | 06f2324bc |
| 7e8c729e4e4ecc320cb411c4d1419bf5fbad733212d4e9491b7630aaef0b8b1c | 729e4e4ecc |
| | |
| *ID No.* | |
| 4644cd59b2f51b77cc734227ba0a5215e6c704c6e3e6fab877b1932a2edb87d4 | 592517 |
| d758a7c46020350fc40f1d1efcaa8ecd0063dee591e244d69ffc1fcdd23ecce7 | 350401 |
| d0a5ac939aee60fd9dafe1a2ad8996864d45c0123eb3e6dc4f72b0340c1040c1 | 609128 |
| | |
| *Forename* | |
| 7217a23399c2e9537a8101b9f21466956430c634d1b563971e3dd221c2c8031a | cebeca |
| 311e5a52dea0d743b7f43a644bebe260df1db806026f12aa2f70806bb090fada | adadeb |
| | |
| *Valid Names Table* | |
| 3bc51062973c458d5a6f2d8d64a023246354ad7e064b1e4e009ec8a0699a3043 | Sheila |
| dde6accbd2e2c71704054377dc56b3bb596ebc9308df85d1dc95e1884db48992 | Meabh |
| 5883fec4e9d71173a5f6f5d817d69f746a480c0ee6dadb5945154f72a1b2c12d | Alan |
| 6410ef0d3a6d3324fcba02131e5742215c99301055398a75457a27ac89dffb5f | Aaloka |
| | Eavan |
| | Brenda |
| | Catalina |
| | Niamh |

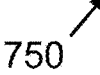

DATA ANONYMISATION

CROSS REFERENCE TO RELATED APPLICATION

This patent application claims priority to EP application No.: 23201988.5, filed on Oct. 5, 2023, the disclosures of which is incorporated by reference herein in its entirety as part of the present application.

FIELD OF INVENTION

This invention relates to a computer-implemented method of data anonymisation, computer-readable instructions, and a data anonymisation computing apparatus. In particular, the invention relates to data anonymisation of a data set comprising a plurality of records, each record comprising a plurality of fields, including an identifying field comprising personal data of a person, and a utility field comprising non-personal data, wherein data from the identifying field of each record is replaced.

BACKGROUND

Data privacy is an important topic, relevant to both members of the public and organisations who gather and process personal data. Across the world, various rules, laws and regulations have been implemented to protect the personal data of members of the public. The General Data Protection Regulation from the EU is one such regulation, and in the US, the Health Insurance Portability and Accountability Act (HIPAA) protects individuals' medical records and other personal health information. These laws apply penalties to organisations that do not adequately protect individuals' personal data. As such, it is very important for such organisations to ensure they treat personal data correctly.

Personal data may be defined in slightly different ways depending on the context in question, but in general may be understood to refer to information that identifies an individual or could be used to identify them if combined with other data. Examples of personal data include name, identification number, location data, an online identifier, social security number, biometric records, date and place of birth, mother's maiden name, IP address, email address, telephone number and so on.

When an organisation has generated or acquired a data set relating to a group of people, they must ensure that the personal information of those people is protected, within the terms of the relevant legislation. However, they may also wish to analyse and process the data set to gain information therefrom. In examples, they may wish to process the data within their existing applications and systems.

Anonymisation of data is a known technique to remove the personal data from a dataset. When a data set has been anonymised, none of the individuals in the dataset should be identifiable, by the creator of the dataset or by any third party. Anonymisation necessarily removes data from the data set, which can make it difficult to maintain utility of the dataset. It can be said that data utility and data anonymisation are inversely related. Organisations are interested in anonymisation options that enable them to process, including share, real production data.

It is an aim of the present invention to address one or more of the disadvantages associated with the prior art.

BRIEF SUMMARY OF THE DISCLOSURE

In accordance with the present disclosure, there is provided a computer-implemented method comprising combining an original value with a seed value to form a combined value, generating a hash of the combined value, using characters from the hash string to obtain a replacement value, and replacing the original value with the replacement value. This is an efficient and effective data anonymisation method, which is particularly useful for use in large data sets.

In accordance with the present disclosure, there is provided a computer-implemented method of data anonymisation of a data set. The data set includes a plurality of records, each record having a plurality of fields, including an identifying field comprising personal data of a person, and a utility field comprising non-personal data. The method is configured to replace data from the identifying field of each record. The computer-implemented method includes obtaining a seed value for the data set, and also includes, for each record, combining an original data value of the identifying field with the seed value to create a combined value, generating a hash value of the combined value using a cryptographic hash function, the hash value including a string of characters, using characters from the hash value to obtain a replacement value, replacing the original data value with the replacement value, where the replacing includes deleting the original data value, and repeating these operations for each record in the data set.

In this way, the data in the data set may be anonymised in an efficient and effective manner. The resulting data set may be processed and shared without concern that any personal data may be improperly handled. This allows the organisation holding the data set to gain the benefit of the business data represented in the utility field/s of the data set.

Optionally, using characters from the hash value to obtain a replacement value may comprise selecting characters from the hash value in a random or pseudorandom manner and combining them to create a replacement value.

In an aspect, using characters from the hash value to obtain a replacement value may comprise selecting non-consecutive characters from the hash value and combining them to create a replacement value.

Optionally, using characters from the hash value to obtain a replacement value may comprise selecting characters from the hash value such that the first character of the replacement value differs from the first character of the hash value.

In an example, using characters from the hash value to obtain a replacement value may comprise selecting only letters from the hash value and combining them to create a replacement value.

In an aspect, the method may comprise adjusting the format of the replacement value to create a formatted replacement value. The formatting may include adjusting the number of characters in the replacement value.

In an example, using characters from the hash value to obtain a replacement value may comprise searching a second data set for the hash value, and if the hash value is present, using the corresponding replacement value as the replacement value.

Optionally, the method may comprise, for each original data value, after obtaining the replacement value, saving the hash value with the corresponding replacement value in a second data set.

In an aspect, the method may comprise deleting the second data set when the original data value for each identifying field has been replaced with a replacement value.

In an example, each record in the data set may comprise a plurality of identifying fields and the method comprises repeating the steps for each identifying field of the records. Each record in the data set may comprise a plurality of utility fields. The utility fields may comprise data such as enterprise data which can provide useful results when analysed.

In accordance with the present disclosure, there is provided a computer-implemented method of data anonymisation of a plurality of linked data sets each comprising a plurality of records, each record comprising a plurality of fields, including an identifying field comprising personal data of a person, and a utility field comprising non-personal data, the method adapted to replace data from the identifying field of each record, the method comprising implementing the methods disclosed herein on each of the plurality of linked data sets, comprising using the same seed value for each of the plurality of linked data sets.

In this way, the data of the utility fields, which may be referred to as enterprise data, business data, utility data or the like, from the linked data sets may be securely processed, analysed and shared. The use of linked data sets provides greater context and utility to the data therein, however the link between the data sets may be lost through anonymisation. The teaching of the present disclosure can allow those links to be maintained in the anonymised data sets, thus increasing the utility of the non-personal data in the data sets.

In accordance with the present disclosure, there is provided a computing apparatus comprising: a processor; and a memory storing instructions that, when executed by the processor, configure the apparatus to: obtain a seed value for a data set including a plurality of records, each record having a plurality of fields, including an identifying field including personal data of a person, and a utility field including non-personal data. Then, for each record, configure the apparatus to: combine an original data value of the identifying field with the seed value to create a combined value, generate a hash value of the combined value using a cryptographic hash function, the hash value comprising a string of characters, use characters from the hash value to obtain a replacement value, replace the original data value with the replacement value, wherein the replacing includes deleting the original data value; and repeat for each record in the data set.

In another aspect, there is provided computer-readable instructions which, when executed by a computer, are arranged to perform any of the above methods.

Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention are further described hereinafter with reference to the accompanying drawings, in which:

FIG. 1 is a flow diagram of a method according to an embodiment of the disclosure;

FIG. 2 is a flow diagram of a method according to another embodiment of the disclosure;

FIG. 6(a) is a flow chart of a method according to another embodiment of the disclosure using a second data set;

FIG. 7(a) is an example of a data set for use with the methods disclosed herein; and FIG. 7(b) is an example of a second data set according to the disclosure.

DETAILED DESCRIPTION

Figure 3:
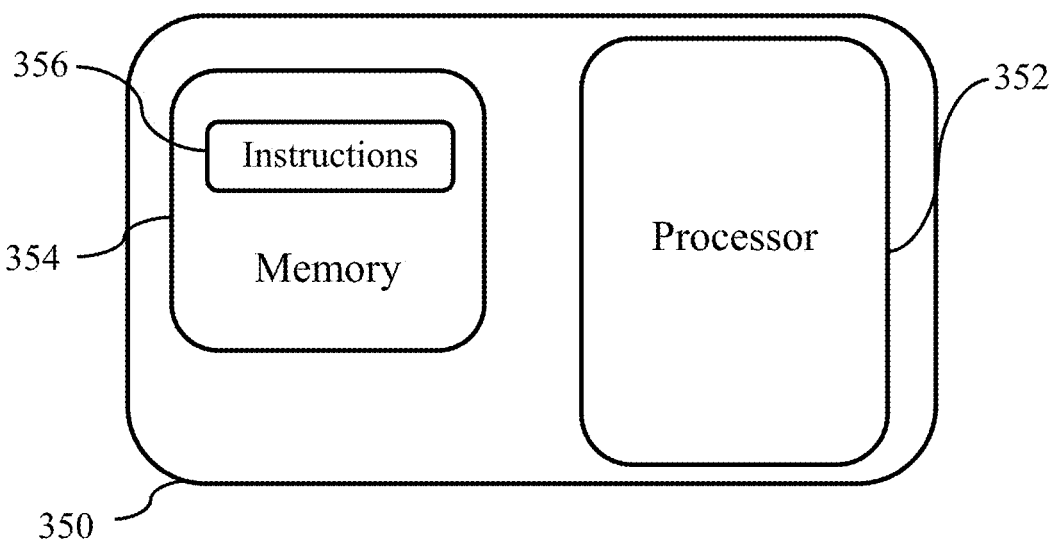
FIG. 3 is a block diagram of a data anonymisation computer apparatus according to an embodiment of the disclosure.

The present invention will now be described more fully hereinafter with reference to the accompanying drawings, in which embodiments of the invention are shown. This invention may, however, be embodied in many different forms and should not be construed as limited to the embodiments set for the herein. Rather, these embodiments are provided so that this disclosure will be thorough and complete, and will fully convey the scope of the invention to those skilled in the art.

The present disclosure relates to the processing of data sets, where a data set comprises a plurality of records, each record comprising a plurality of fields, including an identifying field comprising personal data of a person, and a utility field comprising non-personal data. The data set may be in the form of a spread sheet, where each sheet row may be considered to be a record; in the form of a table in a database, including relational databases, XML-based databases, and the like or in another form. Each record has at least one identifying field which comprises personal data of a person. The personal data may include data that directly or indirectly identifies the person, or data that may be used to identify that person in combination with other data. The identifying field may comprise for example a person's name, identity number, e-mail address or the like. Each record also has at least one utility field, which may include data relating to the use, purpose or function of the data set. Typically, a record may comprise a plurality of utility fields. For example, if the data set is an employee database, a utility field may relate to the department that a particular employee works in, whether they've had their annual appraisal, when their next holiday is scheduled for, or the like. If the data set is a patient database of a medical practice, a utility field may relate to the name of the patient's insurance company, the number of visits they've made in the last 12 months, the name of their preferred pharmacy and the like. In this way, the company can analyse how many employees per department have had their appraisal, or how many patients use a particular pharmacy.

Referring to FIG. 1, there is shown a flow diagram of a computer-implemented method of data anonymisation according to an example of the disclosure. The method, indicated generally by the reference numeral 100, comprises, at block 102, combining an original value with a seed value to form a combined value. At block 104, the method 100 comprises generating a hash of the combined value. This hash provides an output in the form of a string of characters. The method 100 comprises, at block 106, using characters from the hash string to determine a replacement value. At block 108, the method 100 comprises replacing the original value with the replacement value.

Figure 4:
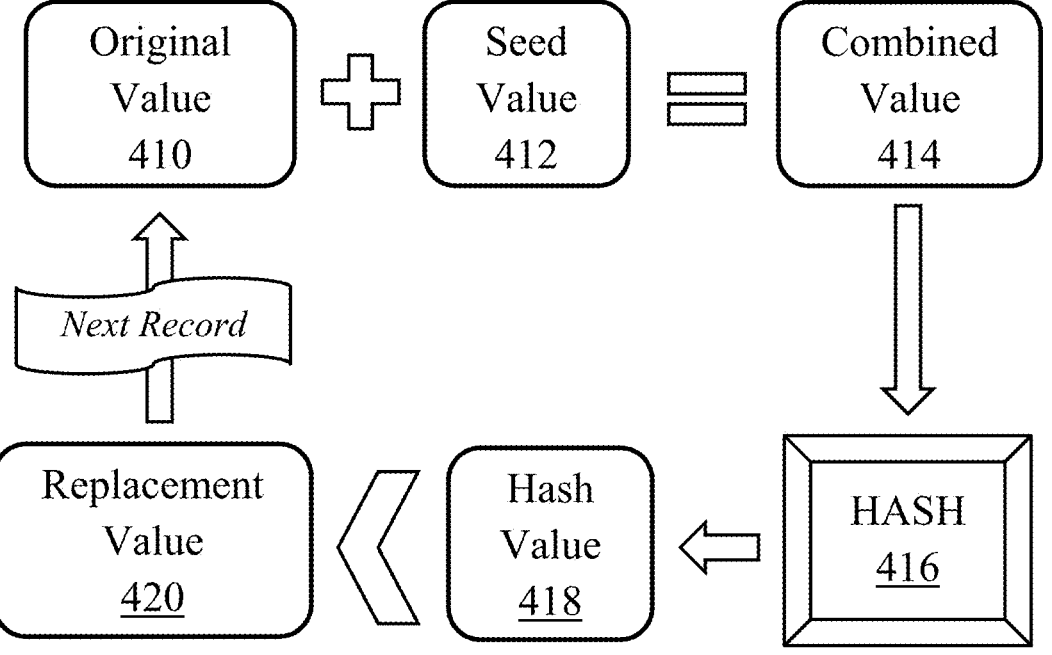
FIG. 4 is a process diagram relating to the methods according to embodiments of the disclosure.

Referring to FIG. 2, there is shown a flow diagram of a computer-implemented method of data anonymisation according to a further example of the disclosure. Additionally, FIG. 4 shows a process diagram that may be considered in combination with FIG. 2. The method, indicated generally by the reference numeral 200, is a computer-implemented method of data anonymisation of a data set. The data set comprises a plurality of records, and each record comprises a plurality of fields. The plurality of fields includes an identifying field comprising personal data of a person, and a utility field comprising non-personal data. The method is configured to replace data from the identifying field of each record. The method 200 comprises, at block 201, obtaining a seed value 412. Then, for each record of the data set, the method 200 comprises, at block 202, combining the original data value 410 of the identifying field with the seed value 412 to create a combined value 414. The method 300 may read the original value from the data set. At block 204, the method 200 comprises generating a hash value 418 of the combined value 414 using a cryptographic hash function 416. The hash value 418 comprises a string of characters. The method 200 comprises, at block 206, using characters from the hash value 414 to obtain a replacement value 420. At block 208, the method 200 comprises replacing the original data value 410 with the replacement value 420. Replacing the original data value 410 with the replacement value 420 includes deleting the original data value 410. This may include writing the replacement value into the identifying field in the data set. The operations of blocks 202, 204, 206, and 208 are repeated for all the records of the data set. In this way, the original data values 410 in the identifying field of each record in the data set are replaced with a value that does not contain any personal information. Additionally, the original data value 410 has been deleted. The personal information that was previously present in the identifying field is no longer available to a user accessing the data set, nor is it derivable from the replacement value 420.

The seed value may be any chosen value from a single character to a longer string of characters. In an example, the seed value may be related to or derived from an identifier associated with a party related to the data set.

The original value and seed value may be combined in a number of ways as will be apparent to the skilled person, for example, concatenation, insertion of characters, such as a space, or bit-level operations such as an exclusive OR operation combination, and so on.

Before the cryptographic hash function 416 is applied to the combined value 414, one or more of the original value 410, seed value 412, or combined value 414 may undergo a pre-processing procedure. The pre-processing may include adjusting the case of the characters, such as applying a uniform case to the characters. Preprocessing may also include removing spaces from the values, in particular trailing spaces. Such preprocessing can improve the utility quality of the anonymised data. Consider for example a name "John" written as "John" (i.e. with a trailing blank space). "John" and "John" are different characters strings and they would result in different hash values being generated by the cryptographic hash function 416, which in turn would lead to completely different replacement names, However, when pre-processing is performed, the replacement names generated would be same and hence the business utility of the output anonymised data would be higher.

The cryptographic hash function 416 may be any suitable cryptographic hash function, including SHA-256 or other SHA variants, BLAKE variants, and so on.

In certain examples, the original data value may be subject to pre-processing to identify a portion of the data value to be anonymised and a portion that will not be anonymised. For example, this may occur for an email address field where the domain is to be retained, for a phone number where the area code or international dialling code is to be retained, and so on.

Referring now to FIG. 3, there is shown a block diagram of a data anonymisation computing apparatus 300 which may be used to implement the methods of data anonymisation of a data set described herein. As discussed above in relation to FIG. 2, the data set comprises a plurality of records, and each record comprises a plurality of fields. The plurality of fields include an identifying field comprising personal data of a person, and a utility field comprising non-personal data. The data anonymisation computing apparatus 300 is configured to replace data from the identifying field of each record. The computing apparatus 300 comprises a processor 302 and memory 304. The memory 304 stores instructions 306 that, when executed by the processor 302, configure the apparatus to obtain a seed value 412 for the data set. Then, for each record of the data set, the instructions 306 configure the processor 302 to combine an original data value 410 of the identifying field of a first record with the seed value 412 to create a combined value 414; generate a hash value 418 of the combined value 414 using a cryptographic hash function 416, the hash value 418 comprising a string of characters; use characters from the hash value 418 to obtain a replacement value 420; and replace the original data value 410 with the replacement value 420, wherein the replacing includes deleting the original data value 410. The instructions 306 configure the processor 302 to repeat these operations for each record in the data set.

In some data sets, there may be more than one identifying field per record. In such cases, the method can be implemented for each identifying field. In some cases, the method may process each identifying field in a record before moving to the next record, however, the method may also process a first identifying field in each record, before returning to the first record to process the second identifying field of each record.

The method 200 may comprise adjusting the format of the replacement value to create a formatted replacement value. In this way, the method 200 allows the replacement value to meet any formatting specifications that may be associated with the applications or systems that will be processing the anonymised data. In an example, the formatting may include adjusting the number of characters in the replacement value. In another example, the formatting may include appending or prefixing the replacement value with specific additional text. This may comprise dummy data such as a dummy domain for an email address, or valid international dialling codes, which may be retrieved from a look-up table. The applications or systems that will be processing the anonymised data set may include those from which the data set originates, and/or those with which the methods or computing apparatus described herein interact. For example, the data set may be in a database that has defined acceptable data types, character limits, formatting requirements and the like in relation to the data values stored in its records. The formatted replacement data values according to the disclosure will meet those definitions so that the anonymised data set maintains utility within those applications and systems.

Figure 5:
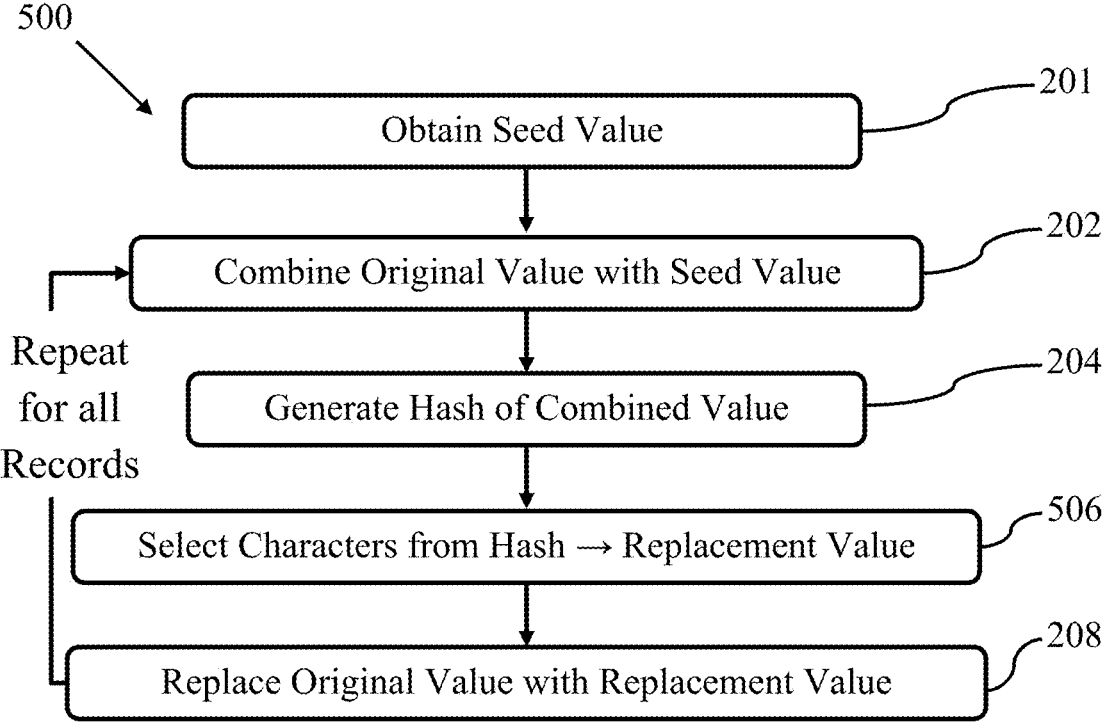
FIG. 5 is a flow chart of a method according to a further embodiment of the disclosure.

Referring now to FIG. 5, there is shown a flow chart of another computer-implemented method according to an aspect of the disclosure. The computer-implemented method, indicated generally by the reference numeral 500 is similar to the computer-implemented method 200 described herein in relation to FIG. 2, and like reference numerals have been used where appropriate to refer to the same step. The computer-implemented method 500 of FIG. 5 differs from that shown in FIG. 2 in that the feature in block 206 of using characters from the hash value 418 to obtain a replacement value 420 has been replaced with the feature of selecting characters from the hash value 418 and combining them to create the replacement value 420, labelled as block 506.

Characters may be selected from the hash value 418 in a consecutive or non-consecutive manner. Characters may be selected from the hash value 418 in a random or pseudo-random manner. In an example, the first character of the replacement value 420 is different from the first character of the hash value 418. In an example, a string of consecutive characters may be selected from the middle of the hash value 418, where the starting point is determined randomly or is predetermined. In another example, every second or every third character may be selected. In a further example, a random value is obtained and the characters are selected in dependence on that random value. In these ways, the selection of the characters adds a further degree of complexity to the determination of the replacement value 420, strengthening the anonymisation and making it more difficult to reverse engineer. The manner of selecting characters from the hash value and combining them may be varied, for example, to adjust the level of utility and anonymisation in the anonymised data set. For example, random selection of characters from the hash value would ensure that the same original value would result in different output values, and vice versa.

In an example, the characters selected from the hash value 418 may be either all digits or all letters. In this way, the text value of a data value for a field may match the expected structure and formatting of that field. For example, for a phone number field, issues may arise if the replacement value contained letters, or for a first name field, the presence of digits in the replacement value may be problematic. The replacement values may be formatted to provide formatted replacement values, which may include adjusting the number of characters in the replacement value, including appending additional characters to the replacement value. These additional characters may be obtained from a look-up table. The length of a formatted replacement value may be dependent on the number of characters in the hash value, or the number of letters or digits in the hash value. For example, where the hash value has 20 letters or less, a letter-based formatted replacement value may have 6 letters, but if the hash value has more than 20 letters, then the formatted replacement value may have 8 letters. In this way, the method provides for further a further aspect of randomness in the replacement values. In this way, the replacement values are consistent with the characteristics of the field of the original value, and do not require any verification or other checking before the replacement operation.

Figure 6A:
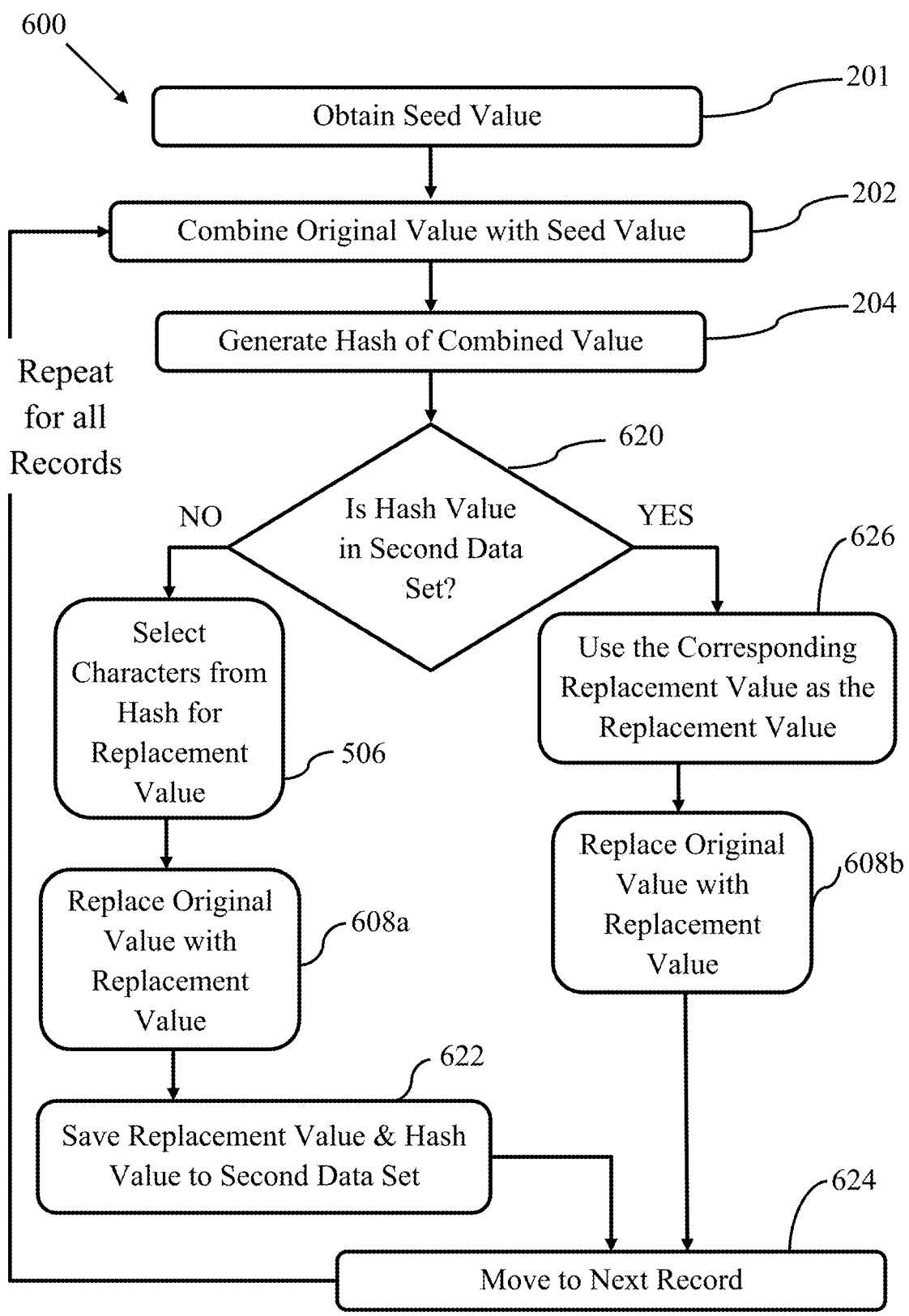
FIG. 6(a) is a flow chart of a method according to an embodiment of the disclosure using a second data set.
Figure 6B:
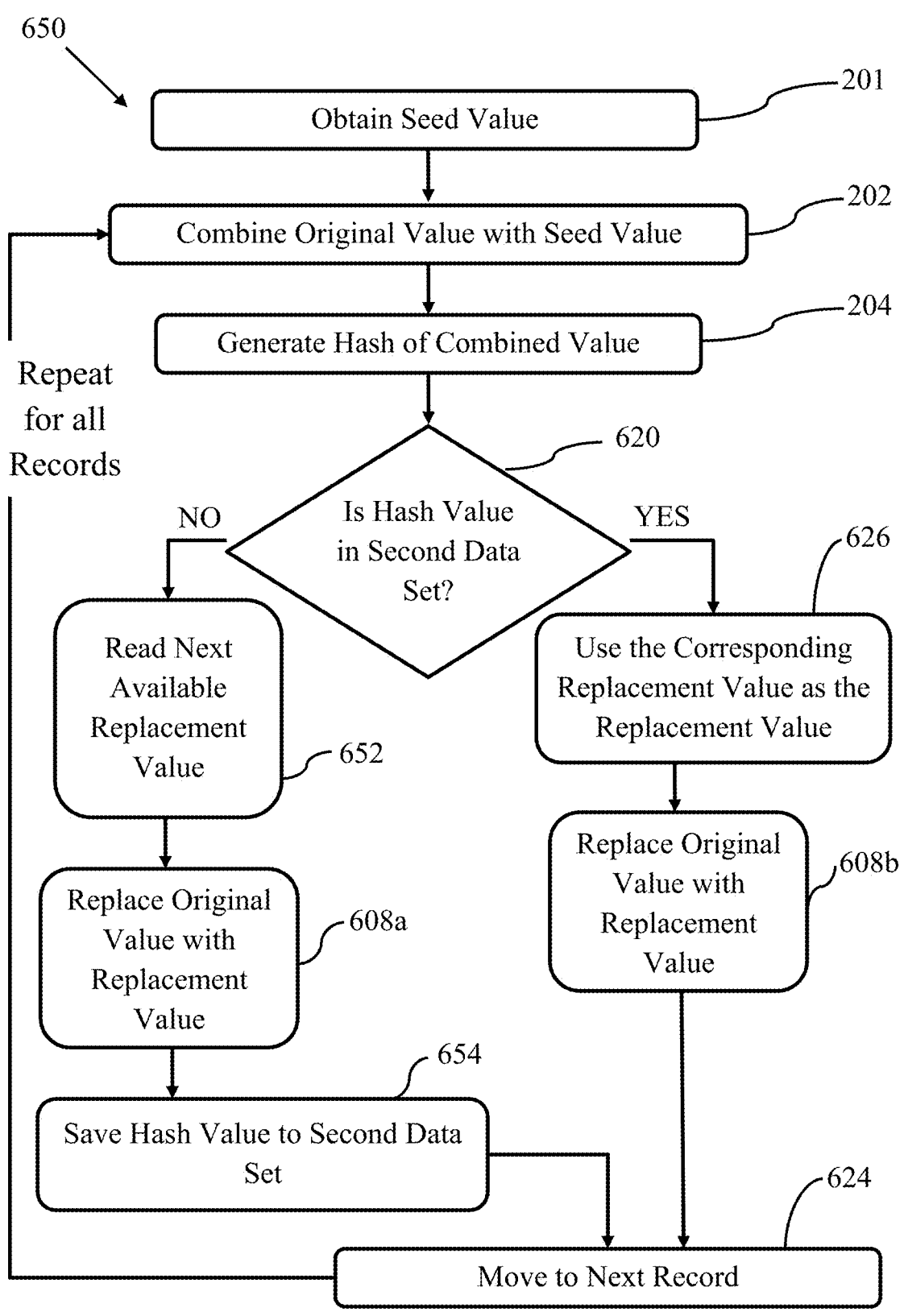

Referring now to FIG. 6(*a*), there is shown a flow chart of a further computer-implemented method according to an aspect of the disclosure. The computer-implemented method, indicated generally by the reference numeral 600 is similar in part to the computer-implemented method 200 described herein in relation to FIG. 2 and the computer-implemented method 500 described herein in relation to FIG. 5, and like reference numerals have been used where appropriate. The method 600 described herein in relation to FIG. 6(*a*) uses a second data set to obtaining the replacement value.

The computer-implemented method 600 begins as in the same manner as described in relation to FIG. 2, at block 201, by obtaining the seed value 412. At block 202, the original value 410 is combined with the seed value 412 to form the combined value 414. Then at block 204, a hash value 418 is generated using a cryptographic hash function 416. At this stage, the method deviates from those previously described herein. At block 620, the method 600 searches a second data set for the hash value 418. The second data set may be a table or other suitable file. The second data set may be created by the method 600 or may be otherwise available to the method 600. If the hash value 418 is not found in the second data set, the method 600 continues as per the method 500 described in relation to FIG. 5, where at block 506, characters are selected from the hash value 418 and combined to form the replacement value 420. Then, at block 608*a*, the original data value 410 is replaced with the replacement value 420. The corresponds to the operation described in relation to block 208 in the description of FIG. 2. Then an additional operation is included at block 622, where the method 600 comprises saving the hash value 418 with the corresponding replacement value in the second data set. The method then moves to block 624 where the method 600 moves to consider the next record and repeat the relevant operations for each record.

If, at block 620, the hash value 418 is present in the second data set, then the corresponding replacement value 420 saved with the hash value 418 therein is used as the replacement value 420. Then, as in the other branch of the method 600, the original value 410 is replaced by the replacement value 420, at block 608*b* (which corresponds to blocks 208 and 608*a*). After block 608*b*, the method 600 proceeds to block 624 where the method 600 moves to consider the next record and repeat the relevant operations for each record.

The use of the second data set in this method 600 allows a reduction in processing time in obtaining replacement values 420. Furthermore, this method is also useful if it is preferred to ensure that identical original values 410 have identical replacement values 420. Identical original values 410 will result in identical hash values 418, however, aspects of the methods described herein may result in different replacement values 420 from identical hash values. Hash values can often be hexadecimal outputs, comprising the characters 0123456789abcdef, thus selecting letters from such a hash value would lead to only six letters. Using the second data set Additionally, in a rare case of hash collisions, where two different input values result in same hash values, the use of replacement table can avoid having the same replacement value for two different input values. Where the replacement value is formatted before the replacement operation, the formatted replacement value may be stored in the second data set.

Referring now to FIG. 6(*b*), there is shown another example of a computer-implemented method, indicated generally by the reference numeral 650, using a second data set. In this example, the second data set is populated with replacement values before the method begins. This is useful if authentic looking replacement values are preferred, for example, if authentic names are preferred, or names associated with a particular gender or ethnicity are preferred. In such a case, the second data set is populated with data that meets the preferred specification.

The method 650 of FIG. 6(*b*) proceeds as described in relation to FIG. 6(*a*) as far as block 620, where the second data set is searched for the hash value. If the hash value 418 is present in the second data set, the method 650 proceeds substantially as in the method 600 of FIG. 6(*a*) in that, at block 626, the method reads, from the second data set, the replacement value 420 corresponding to hash value 418 and uses that as the replacement value 420. The original value 410 is then replaced by the replacement value 420 at block 608*b*. The replacement value may be formatted before the replacing operation, such that the formatted replacement value is used to replace the original value 410. Then, as in the method 600 of FIG. 6(*a*), the method 650 proceeds to block 624 where the method 650 moves to consider the next record and repeat the relevant operations for each record.

If the hash value 418 is not present in the second data set at block 620, the next available replacement value 420 is read from the second data set, at block 652. That replacement value 402 is then used to replace the original data value 410 at block 608*a*, after any formatting if appropriate. At block 654, the hash value 418 is saved in the second data set in combination with the replacement value 420 that was used. After block 624, the method 650 proceeds to block 654 where the method 650 moves to consider the next record at block 624 and repeat the relevant operations for each record.

The second data set does not need to contain the same number of replacement values as the number of records in the data set. Once the list of entries for use as replacement values in the second data set is expended, each value may be modified slightly and re-used. For example, the name Anne Conway may become Anne Conway1, and eventually Anne Conway2 and so on as required.

Formatted replacement values may also be saved in the second data set and used at the replacement value for subsequent searches in the second data set for that hash value.

Referring now to FIG. 7(*a*) there is shown examples of a data set for use with the methods described herein, and a second data set for use with the method 600 described herein in relation to FIG. 6. FIG. 7(*a*) shows a data set, indicated generally by the reference numeral 700, comprising eight records, each record having six fields of ID no., Forename, Surname, Department, Detail X and Detail Y. Each of ID no., Forename, Surname are identifying fields comprising personal data, and Department, Detail X and Detail Y are utility fields comprising non personal data.

The data set 700 shown here is small in size for convenience of illustration, however in reality, a data set for use with the invention may be orders of magnitude larger than that illustrated. It is noted that any item of data about a person can become personal data in the context of a particular data set. For example, in the example data set 700, Department could be considered as personal data as there is only one person in the Retail department. Therefore, if a third party knew there was one person in the Retail department and they saw this data set, after the ID no., Forename, and Surname fields had been anonymised, they would still be able to identify the Retail Department employee and would know the relevant values for Detail X and Detail Y for that employee. However, this issue is addressed with other techniques of anonymisation which are outside the scope of this disclosure.

Referring now to FIG. 7(*b*) there is shown examples of a second data set for use with the methods 600, 650 described herein in relation to FIGS. 6(*a*) and 6(*b*). The second data set is indicated generally by the reference numeral 750 and contains two examples of hash values for an email local part i.e. the part of an email address before the @ symbol and the corresponding replacement values; three examples of hash values for an ID number field and the corresponding replacement values; and two examples of the hash values for a forename field and the corresponding replacement values. The illustrated second data set also includes examples of pre-populated replacement values that may be used with the method 650 described herein in relation to FIG. 6(*b*), a Valid Names Table. In relation to the email local part value, the replacement value is a string of consecutive characters from the hash value, wherein the string commences at a random character in the hash value. In the examples shown, the replacement values start at the fifteenth and fifth characters respectively. In the examples of the ID number field, the replacement values have selected digits from the hash value, starting at a random point in the hash value and then selecting consecutive characters while discarding letters. If the end of the hash value is reached before sufficient digits are read, the method may continue reading from the beginning of the hash value. In the examples of the forename field, letters have been selected from the hash value in a consonant-vowel-consonant pattern, to produce a "word" that is legible, if not an actual name or word. Letters may be selected in this manner, or selected in other ways and then rearranged into this pattern. In relation to the Valid Names Table, the replacement value column is pre-populated with suitable names. These are assigned to hash values as the method 650 progresses. As such, in the illustrated example, the names Sheila, Meabh, Alan and Aaloka have been used as replacement values, and the next name to be used is Eavan. In use, a second data set may not combine entries relating to different fields in the same second data set. Instead, each field may be treated separately. The replacement values shown in FIG. 7(*b*) illustrate a number of ways in which replacement values may be formed by selecting characters from the hash value and combining them.

Once the data set has been anonymised completely, the second data set may be deleted.

The methods and apparatus described herein may be used in relation a wide range of data types that may be contained within identifying fields of a data set, for example, email address, including maintaining the domain or replacing the domain; name; phone number, including maintaining area and/or country code, or full replacement; date, including maintaining the year, and maintaining adult or child status for a date of birth; and text, which may include official IDs; bank information, organisation-specific IDs, Where an email address field is to be anonymised completely, that is the anonymisation comprises the domain, the replacement value may be calculated for the local part of the email address, then formatted by concatenating the replacement value with a dummy domain such as "@dummy.com". In this way the formatted replacement value still appears to be an email address but is fully anonymised. An application that processes data sets may parse the content of an email address field to ensure the data in the field is an email address. Such an application may process the anonymised data set without determining that there are errors in the email address field.

The seed value may be determined from a random or pseudorandom number generator; from a value associated with the data set, for example a file name, data owner name, username; chosen by a person; or the like. The seed value may be received from an external entity or determined as part of the method 200.

With large organisations, there may be a number of linked data sets. Linked data sets may be those that have at least one field in common. For example, an organisation may have an employee database, with which includes each employee's name and employee ID number, and may also have a sales database which identifies sales made by each employee, and identifies them by their employee ID number. When these databases are anonymised, this link between them will be lost. The present disclosure allows the anonymised databases to remain linked, if desired, by using the same seed value for each database data set. According to the present disclosure, there is provided a computer-implemented method of data anonymisation of a plurality of linked data sets, where each data set comprises a plurality of records, and each record comprises a plurality of fields. The fields include an identifying field comprising personal data of a person, and a utility field comprising non-personal data. The method is adapted to replace data from the identifying field of each record, by implementing any of the methods of data anonymisation described herein on each of the plurality linked data sets, comprising using the same seed value for each of the plurality of linked data sets. Thus, where a plurality of linked data sets are to be anonymised according to the present disclosure, a suitable seed value may be chosen for use with the methods of the disclosure that is then used in anonymising each of the linked data sets.

The methods and apparatus disclosed herein enable organisations to use the personal, sensitive and confidential data of individuals, in accordance with privacy regulations, such as GDPR, through anonymisation without losing the business utility of the anonymised data. In this way, the anonymised data may still be used within the organisation or externally to provide benefit to the organisation. In an example, the anonymised data set may be used as data on which new users of their systems may be trained without any privacy concerns. In another example, the anonymised data set may be used as training data for AI technologies.

The present invention relates to computer-implemented data anonymisation comprising combining an original value with a seed value to form a combined value, processing the combined value to provide an output in the form of a string of characters, using characters from the hash string to determine a replacement value. The invention provides anonymised data sets which have retained utility relating to their intended purpose or function.

Certain aspects of the disclosure may be implemented using machine-readable instructions which may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors. The memory may include volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape.

It will be appreciated that aspects of the disclosure can be realised in the form of hardware, software or a combination of hardware and software. Furthermore, aspects of the present disclosure may be conveyed electronically via any medium such as a communication signal carried over a wired or wireless connection.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, or characteristics, described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. As such, it will be appreciated that various changes and modifications can be made to the present invention without departing from the scope of the present application.

The reader's attention is directed to all papers and documents which are filed concurrently with or previous to this specification in connection with this application and which are open to public inspection with this specification, and the contents of all such papers and documents are incorporated herein by reference.

What is claimed is:

1. A computer-implemented method of data anonymisation of a data set comprising a plurality of records, each record comprising a plurality of fields, comprising an identifying field comprising personal data of a person, and a utility field comprising non-personal data, the computer-implemented method configured to replace data from the identifying field of each record, the method comprising:

obtaining a seed value for the data set; and for each record:

combining an original data value of the identifying field with the seed value to create a combined value, generating a hash value of the combined value using a cryptographic hash function, the hash value comprising a string of characters, using characters from the hash value to obtain a replacement value, and replacing the original data value with the replacement value, wherein the replacing comprises deleting the original data value; and repeating for each record in the data set;

wherein, after generating the hash value, using characters from the hash value to obtain a replacement value comprises searching a second data set for the hash value, and if the hash value is present, using the corresponding replacement value as the replacement value;

further comprising:

for each original data value, after obtaining the replacement value, saving the hash value with the corresponding replacement value in a second data set.

2. The computer-implemented method of claim 1, wherein using characters from the hash value to obtain a replacement value comprises selecting characters from the hash value in a random or pseudorandom manner and combining them to create a replacement value.

3. The computer-implemented method of claim 1, wherein using characters from the hash value to obtain a replacement value comprises selecting non-consecutive characters from the hash value and combining them to create a replacement value.

4. The computer-implemented method of claim 1, wherein using characters from the hash value to obtain a replacement value comprises selecting characters from the hash value such that a first character of the replacement value differs from a first character of the hash value.

5. The computer-implemented method of claim 1, wherein using characters from the hash value to obtain a replacement value comprises selecting only digits from the hash value and combining them to create a replacement value.

6. The computer-implemented method of claim 1, wherein using characters from the hash value to obtain a replacement value comprises selecting only letters from the hash value and combining them to create a replacement value.

7. The computer-implemented method of claim 1, further comprising: adjusting a format of the replacement value to create a formatted replacement value.

8. The computer-implemented method of claim 7, further comprising: adjusting a number of characters in the replacement value.

9. The computer-implemented method of claim 1, further comprising: deleting the second data set when the original data value for each identifying field has been replaced with the replacement value.

10. The computer-implemented method of claim 1, wherein each record in the data set comprises a plurality of identifying fields and the method comprises repeating the steps for each identifying field of the records.

11. A data anonymisation computing apparatus comprising:

a processor; and a memory storing instructions that, when executed by the processor, configure the data anonymisation computing apparatus to carry out the method of claim 1.

\* \* \* \* \*